US011670921B2

(12) United States Patent
Johnston

(10) Patent No.: US 11,670,921 B2
(45) Date of Patent: Jun. 6, 2023

(54) DEVICE FOR CAPTURING A LINE

(71) Applicant: Steven Johnston, Mandurah (AU)

(72) Inventor: Steven Johnston, Mandurah (AU)

( * ) Notice: Subject to any disclaimer, the term of this patent is extended or adjusted under 35 U.S.C. 154(b) by 197 days.

(21) Appl. No.: 16/627,419

(22) PCT Filed: Jun. 28, 2018

(86) PCT No.: PCT/AU2018/050657
§ 371 (c)(1),
(2) Date: Dec. 30, 2019

(87) PCT Pub. No.: WO2019/006493
PCT Pub. Date: Jan. 10, 2019

(65) Prior Publication Data
US 2020/0127449 A1 Apr. 23, 2020

(30) Foreign Application Priority Data
Jul. 3, 2017 (AU) .................. 2017902588

(51) Int. Cl.
*H02G 1/08* (2006.01)
(52) U.S. Cl.
CPC ............ *H02G 1/088* (2013.01); *H02G 1/085* (2013.01)
(58) Field of Classification Search
CPC ........ H02G 1/085; H02G 1/088; H02G 1/081; H02G 1/08; H02G 1/083
See application file for complete search history.

(56) References Cited

U.S. PATENT DOCUMENTS

| | | | |
|---|---|---|---|
| 4,854,546 A * | 8/1989 | Vea | H02G 1/00 254/134.3 R |
| 5,458,317 A * | 10/1995 | Caracofe | H02G 1/00 254/134.3 R |
| 5,957,399 A * | 9/1999 | Siana, Jr. | H02G 3/286 242/381.3 |
| 9,110,268 B2 * | 8/2015 | Leonard | H02G 1/081 |
| 2004/0116920 A1 * | 6/2004 | Rioux | A61B 18/1492 606/41 |

(Continued)

FOREIGN PATENT DOCUMENTS

WO 1997041626 A1 11/1997

OTHER PUBLICATIONS

International Search Report received in PCT/AU2018/050657, dated Jul. 25, 2018.

(Continued)

*Primary Examiner* — Seahee Hong
(74) *Attorney, Agent, or Firm* — Suzannah K. Sundby, Esq.; Canady + Lortz LLP

(57) ABSTRACT

A device for capturing a line passed into a cavity on a first side of a structure and retrieving the line through to a second side of the structure, the device comprising: (a) a first conduit adapted to define a pathway between the first and second sides of the structure and including: first and second lateral guide members that are opposed and each define a first surface that extends into and along the inside of the first conduit; (b) a mounting member for the first conduit; and (c) a resiliently flexible member capable of being passed through the first conduit and defining a stem portion and a loop portion in the cavity to capture said line.

22 Claims, 9 Drawing Sheets

(56) References Cited

U.S. PATENT DOCUMENTS

2006/0231672 A1\* 10/2006 Eastwood .............. H02G 11/02
                                                                    242/588.2
2010/0038128 A1\* 2/2010 Johnston .................. H02G 1/00
                                                                    174/481

OTHER PUBLICATIONS

Written Opinion received in PCT/AU2018/050657, dated Jul. 25, 2018.

\* cited by examiner

Section AA

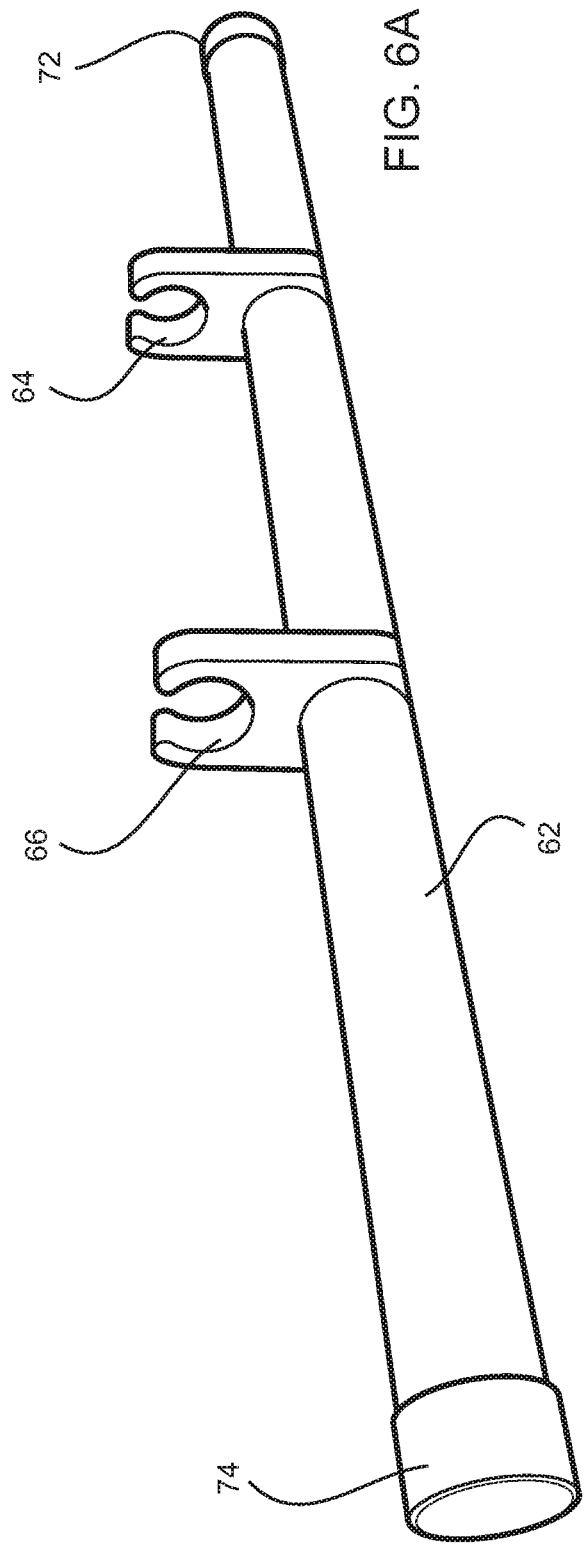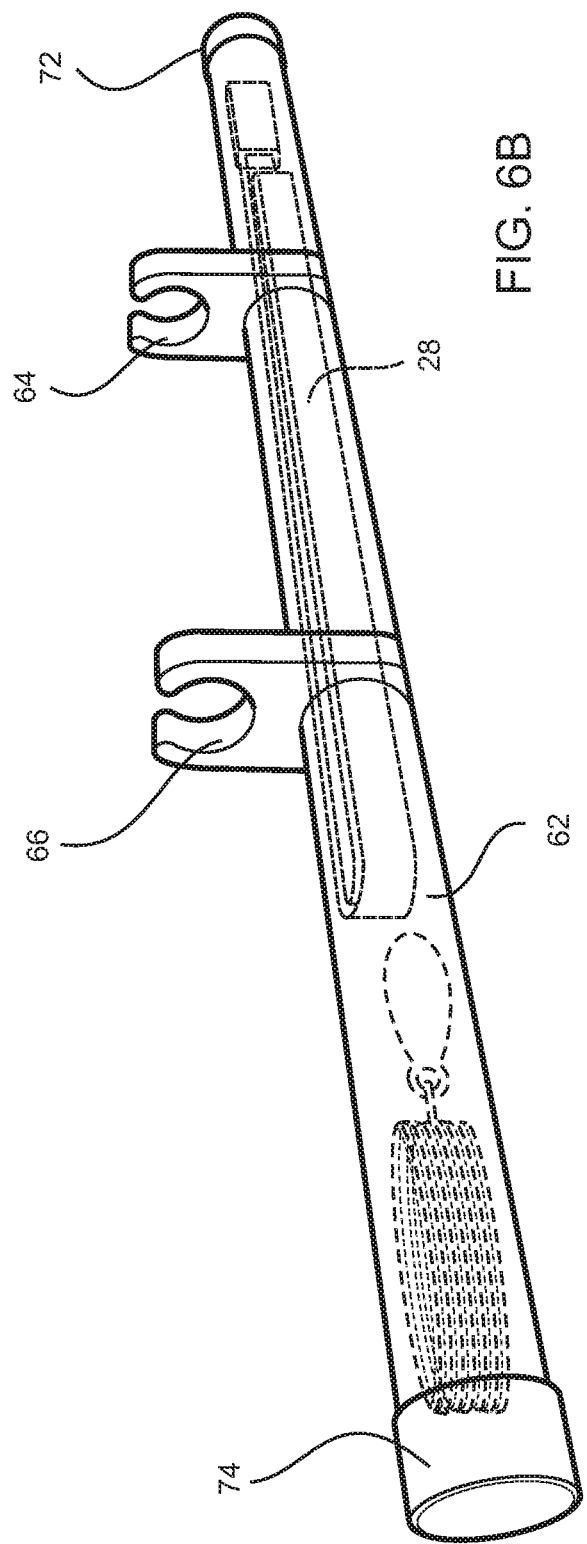

DEVICE FOR CAPTURING A LINE

FIELD OF THE INVENTION

The present invention relates to device for capturing a line passed down a cavity in a structure, such as a wall. Such lines include cabling used in the building industry. The present invention also relates to a kit comprising said device and to methods of using the device and kit.

BACKGROUND OF THE INVENTION

During building construction, cabling, such as electrical cabling, is often directed into internal rooms and areas by being dropped down through a cavity wall and then retrieved through an internal wall. This process is time consuming and difficult and the current solutions are less than ideal.

Existing devices for retrieving cabling from cavities suffer from several problems and limitations. The applicants own prior invention whilst addressing a number of the problems has now been found to suffer from a number of problems of its own principally around the deployment and positioning of the device, in use.

A general object of the present invention to overcome, or at least ameliorate, one or more of the disadvantages with current solutions.

SUMMARY OF THE INVENTION

According to a first aspect, the present invention provides a device for capturing a line passed into a cavity on a first side of a structure and retrieving the line through to a second side of the structure via an opening therethrough, the device comprising:
(a) a first conduit adapted to pass through the opening and define a pathway between the first and second sides of the structure, said first conduit being adapted to allow the line to be retrieved therethrough and including: a first lateral guide member that defines a first surface that extends into and along the inside of the first conduit; and a second lateral guide member, located opposite the first lateral guide member, that defines a second surface that extends into and along the inside of the first conduit;
(b) a mounting member for the first conduit adapted to be releasably fixed to the second side of the structure adjacent to the opening; and
(c) a resiliently flexible member capable of being passed through the first conduit and defining a stem portion, adapted to be guided by said first and second lateral guide members, and a loop portion in the cavity to capture said line.

The present invention also provides a kit comprising:
(a) a device according to a first aspect of the present invention; and
(b) a storage member for the resiliently flexible member, when not in use.

BRIEF DESCRIPTION OF THE DRAWINGS

FIG. 6A is a perspective view of the second tube member depicted in FIG. 5;

FIG. 6B is the same view as FIG. 6B but showing the location of internal components stored therein.

DETAILED DESCRIPTION OF THE INVENTION

Figure 1A:
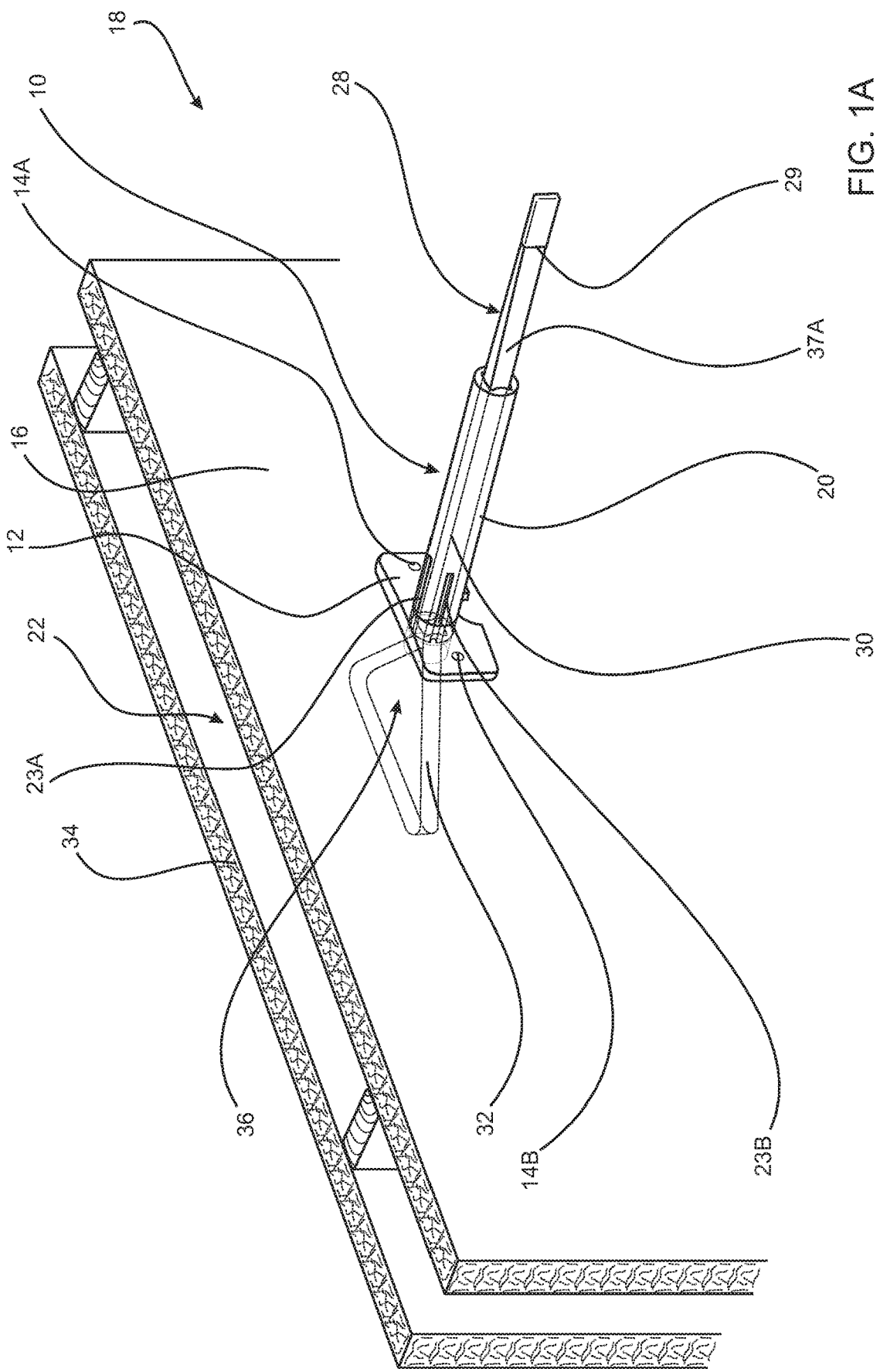
FIG. 1A is a perspective view of a device for capturing a line passed down a cavity, according to one embodiment of a first aspect of the present invention, in use.
Figure 1B:
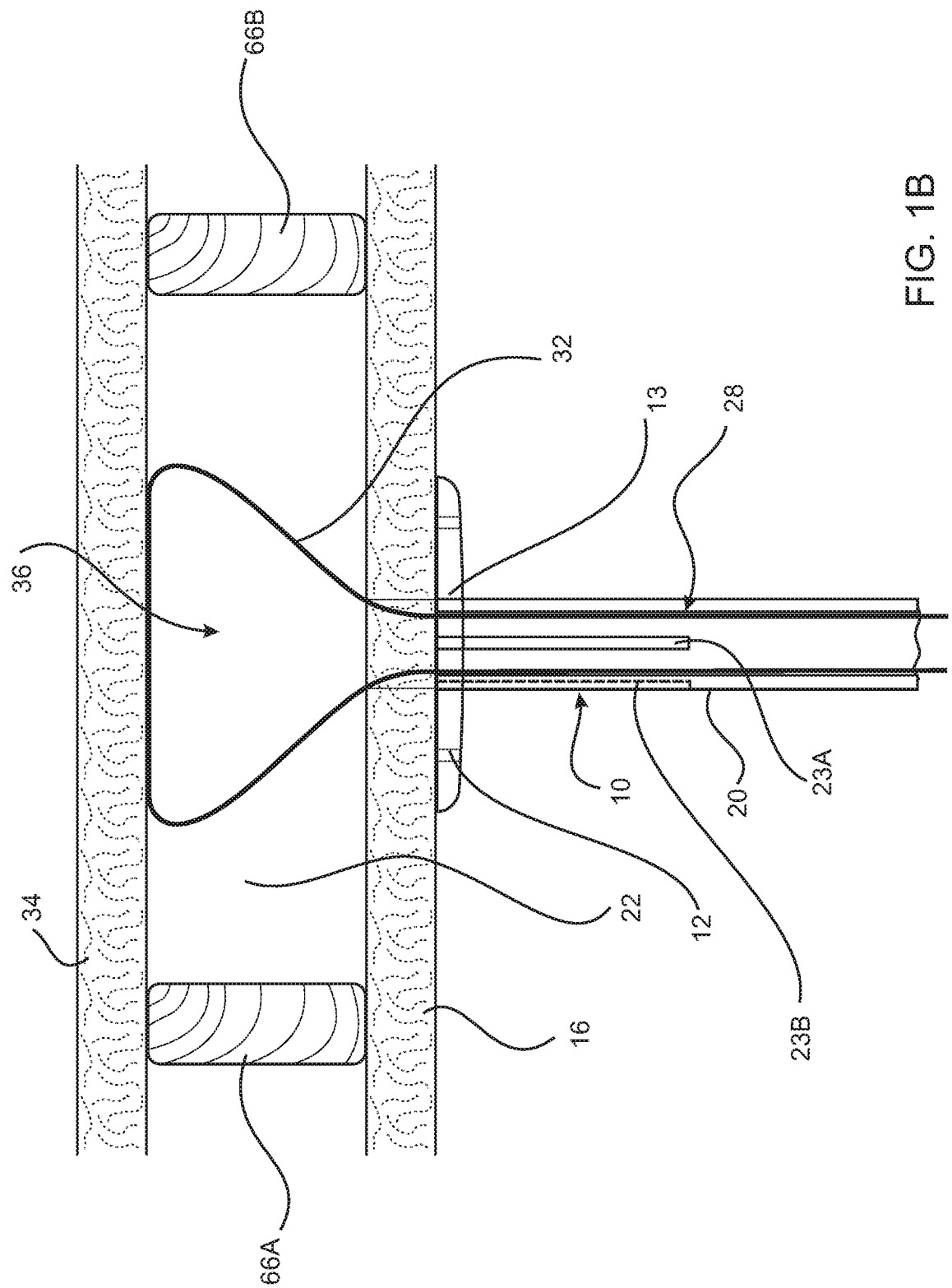
FIG. 1B is a plan view, from above of the view in FIG. 1A.
Figure 1C:
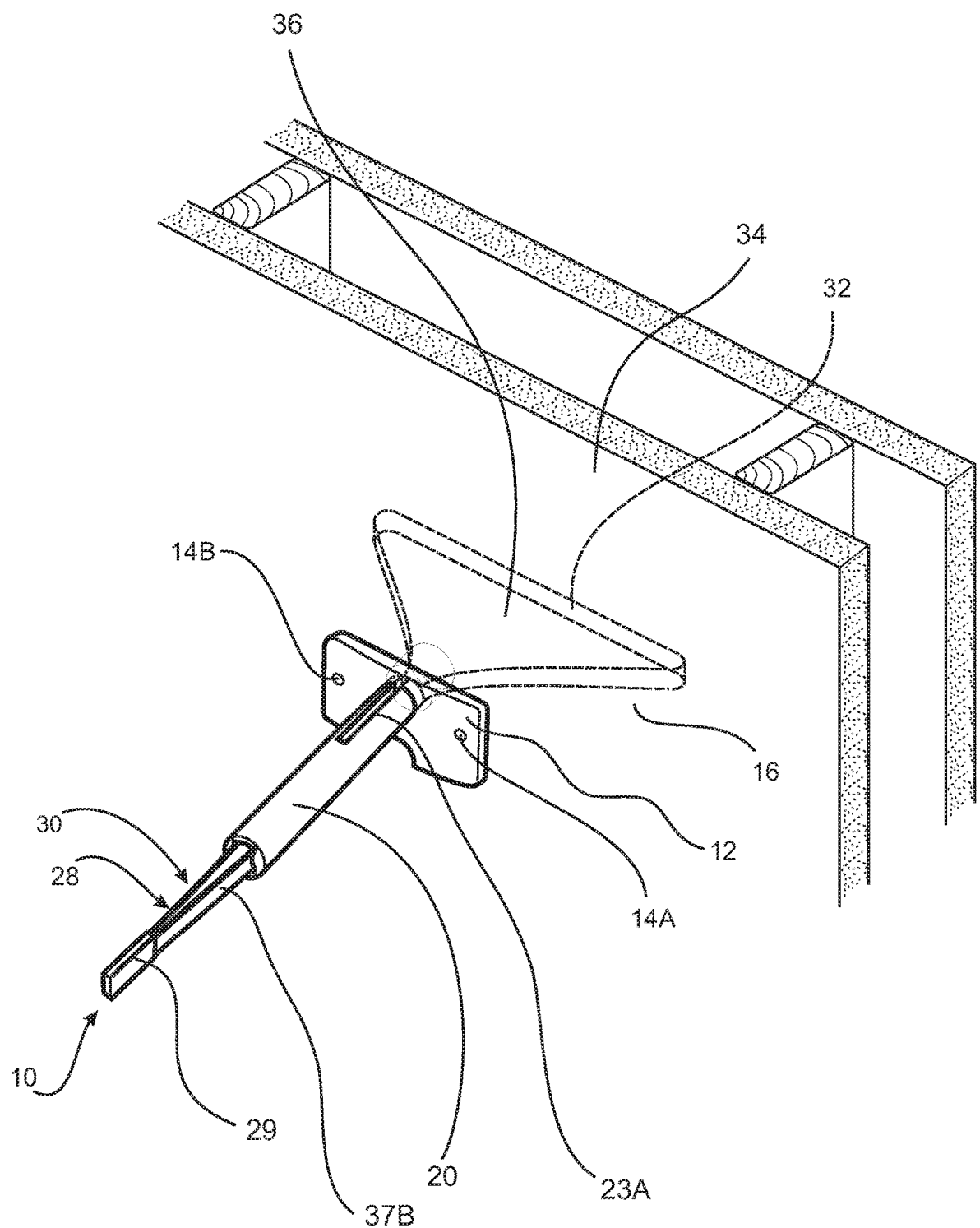
FIG. 1C is another, more detailed, perspective view of the device for capturing a line in FIG. 1A, in use.

According a first aspect of the present invention there is provided a device for capturing a line passed into a cavity on a first side of a structure and retrieving the line through to a second side of the structure via an opening therethrough, the device comprising:
(a) a first conduit adapted to pass through the opening and define a pathway between the first and second sides of the structure, said first conduit being adapted to allow the line to be retrieved therethrough and including: a first lateral guide member that defines a first surface that extends into and along the inside of the first conduit; and a second lateral guide member, located opposite the first lateral guide member, that defines a second surface that extends into and along the inside of the first conduit;
(b) a mounting member for the first conduit adapted to be releasably fixed to the second side of the structure adjacent to the opening; and
(c) a resiliently flexible member capable of being passed through the first conduit and defining a stem portion, adapted to be guided by said first and second lateral guide members, and a loop portion in the cavity to capture said line.

Preferably, the first conduit has a uniformly shaped inner cross section.

Preferably, the first conduit has a circular outer cross section.

Alternatively, the first conduit may have a polygonal outer cross section, such as a square outer cross section.

Preferably, the first conduit comprises at least one longitudinal groove, channel or keyway on its outer surface. Even more preferably, the first conduit comprises two longitudinal grooves, channels or keyways on its outer surface. The groove, channel or keyway is adapted to co-operate with a compatible part of the mounting member, discussed in more detail later herein, to control the movement of relative movement between the two parts such as allow sliding movement and/or limit or prevent relative rotational movement between the first conduit and the mounting member.

When the first conduit comprises two longitudinal grooves they are preferably spaced at right angles to each other or otherwise apart by about 90°.

Preferably, the first conduit comprises a tube.

Preferably, the first and second lateral guide members define a track that guides the movement of the resiliently flexible member through the first conduit.

Preferably, the track allows for the smooth movement of the resiliently flexible member therealong.

Preferably, when in use, the track is adapted to ensure that a main axis of the loop portion of the resiliently flexible member is oriented perpendicular, or near perpendicular to the first side of the structure. This ensures the area of the loop for capturing the line is maximised.

Preferably, the track allows for the resiliently flexible member to expand to a predetermined extent that ameliorates fatigue therein or undesirable deformation or weakening thereof.

Preferably, the first and second surfaces of the first and second lateral guides are shaped to form a nested arrangement with the resiliently flexible member. In one particular form, the first and second surfaces are convex.

Preferably, the mounting member is adapted to be slidably fitted on the first conduit.

Preferably, when fitted to the first conduit, the mounting member is adapted to limit or prevent relative rotational movement between itself and the first conduit.

Preferably, the mounting member comprises a projection, tooth or key that is adapted to be received in the groove or channel of the first conduit.

Preferably, the mounting member includes an aperture for the first conduit. Thus, the first conduit may be adapted to be threaded or slid on to the mounting member.

Preferably, the aperture comprises the projection, tooth or key.

The mounting member and the first conduit may be provided integrally or as a single unit such as a moulded unit.

Preferably, the mounting member is adapted to be releasably fixed to the second side of the structure adjacent to the opening via at least one fixing member that passes through at least one aperture in the mounting member and the second side of the structure.

Preferably, the mounting member comprises two apertures for receive fixing members that pass therethrough and into the second side of the structure.

Preferably, the apertures in the mounting member are positioned to correspond with the position of apertures in an electrical fitting such as a power point or switch. In this regard, it is preferred that any holes formed in the second side of the structure for the mounting member are also used to attach another electrical fitting to the second side of the structure after the device for capturing a line has been used.

Preferably, the mounting member has a shape, size and configuration similar to an electrical fitting such as a power point or switch.

Preferably, the resiliently flexible member is formed as a metal band or strip member with a leading end, a following end and an interior space and is capable of assuming a first configuration in which it is adapted to pass or slide through the first conduit and a second configuration in which it defines the loop portion in the cavity to capture the line. The metal may be spring metal such as spring steel. Even more preferably, the resiliently flexible member is formed of flat spring metal, such as flat spring steel.

Preferably, the resiliently flexible member is capable of assuming its first and second configurations simultaneously.

Preferably, the resiliently flexible member is self-supporting.

Preferably, the resiliently flexible member is formed from a length of metal band having two free ends joined together to form a loop.

Preferably, the resiliently flexible member has a generally concave or "c" shaped cross-section with the concave portion or open part of the "c" facing outwards or towards the first and second surfaces of the first and second lateral guides, when in use.

Preferably, when the resiliently flexible member is inserted in the first conduit, the two outwardly facing concave surfaces frictionally engage or are located immediately adjacent to the first and second surfaces of the first and second lateral guides.

Preferably, the stem portion is adapted to travel in the track defined in the first conduit.

Preferably, the stem portion is adapted to be constrained in the track defined in the first conduit.

Preferably, the stem portion comprises a pair of outward facing lateral surfaces adapted to form a nested arrangement with the first and second surfaces of the first and second lateral guides. Preferably, the outward facing lateral surfaces are concave.

Preferably, the loop portion is a deformable loop portion.

Preferably, the loop portion is adapted to form a generally polygon shape, when deformed, such as a triangle or a triangle with rounded corners.

Preferably, in use, the shape of the loop portion is formed by the loop portion being forced against an opposed surface in the cavity on the first side of a structure.

Preferably, the resiliently flexible member further comprises a handle portion at its following end that is adapted to allow a user to manipulate the resiliently flexible member, in use. Preferably, the handle portion is a sleeve member or cover over a portion of the resiliently flexible member at its following end.

According a second aspect of the present invention there is provided a kit comprising:
 (a) a device according to a first aspect of the present invention; and
 (b) a storage member for the resiliently flexible member, when not in use.

Preferably, the storage member comprises a second tube member. The second tube member may have the same or a similar shape, size and configuration to the first tube member described in relation to the first aspect of the present invention. Alternatively, the second tube member may be the same shape and configuration but larger than the first tube member. In this regard, it may be preferred for the resiliently flexible member to expand and assume a more relaxed form when stored in the second tube member to further ameliorate any fatigue in the resiliently flexible member whilst stored.

Preferably, the second tube member comprises at least one open end. Even more preferably, the second tube member comprises two open ends.

Preferably, the ends of the second tube member are adapted to be closed. Thus, the kit may further comprise at least one closure adapted to close an open end of the second tube member.

Preferably, the storage member and the device according to the first aspect of the invention are adapted to be joined together and even more preferably releasably joined together. Thus, the kit may further comprise at least one or two clip members that are adapted to join the components of the kit together. Preferably, the clip member is adapted to form a friction fit with the kit components to join them together.

The kit may further comprise a plumb line.

When the kit further comprises a plumb line, it is preferred that the storage member is also adapted to retain the plumb line. Thus, the present invention also provides a kit comprising:
(a) a device according to a first aspect of the invention;
(b) a plumb line; and
(c) a storage member for the resiliently flexible member and the plumb line, when not in use.

General

Those skilled in the art will appreciate that the invention described herein is susceptible to variations and modifications other than those specifically described. The invention includes all such variation and modifications. The invention also includes all of the steps and features referred to or indicated in the specification, individually or collectively and any and all combinations or any two or more of the steps or features.

Each document, reference, patent application or patent cited in this text is expressly incorporated herein in their entirety by reference, which means that it should be read and considered by the reader as part of this text. That the document, reference, patent application or patent cited in this text is not repeated in this text is merely for reasons of conciseness. None of the cited material or the information contained in that material should, however be understood to be common general knowledge.

The present invention is not to be limited in scope by any of the specific embodiments described herein. These embodiments are intended for the purpose of exemplification only. Functionally equivalent products and methods are clearly within the scope of the invention as described herein.

The invention described herein may include one or more range of values (e.g. size etc). A range of values will be understood to include all values within the range, including the values defining the range, and values adjacent to the range which lead to the same or substantially the same outcome as the values immediately adjacent to that value which defines the boundary to the range.

For the purposes of the present invention the terms "leading" and "following" for example in the phrases "leading end" and "following end" refer to positions relative to the process of inserting the resiliently flexible member into a cavity. "Leading" as used herein refers to a feature or part thereof that is closest or proximal to the wall of the cavity opposed to the opening whereas "following" refers to a feature or part thereof that is furthest or distal to the opening.

Throughout this specification, unless the context requires otherwise, the word "comprise" or variations such as "comprises" or "comprising", will be understood to imply the inclusion of a stated integer or group of integers but not the exclusion of any other integer or group of integers.

Other definitions for selected terms used herein may be found within the detailed description of the invention and apply throughout. Unless otherwise defined, all technical terms used herein have the same meaning as commonly understood to one of ordinary skill in the art to which the invention belongs.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

DESCRIPTION OF THE PREFERRED EMBODIMENTS

FIGS. 1A-1D depicts a device, generally indicated by the numeral 10, for capturing a line passed down a cavity, according to one embodiment of a first aspect of the present invention, in use.

The device 10 comprises a mounting member in the form of face plate 12, shaped and configured to correspond to the face plate of a single power point, and including a pair of apertures 14A, 14B (best seen in FIG. 1C) to receive screw fixings to attach the face plate 12 to the second side of a structure in the form of the interior surface 16 of a cavity wall 18 formed from gyprock or some other similar sheet material affixed to opposite sides of support members such as vertical stud members 66A, 66B to form a sandwich construction including the cavity 22. A first conduit, in the form of a circular tube 20, is adapted to slidably mount to the face plate 12 via an aperture therein and forms a passage or pathway through aperture 13 and between the interior surface 16 and the cavity 22 on the first side of the wall 18.

The circular tube 20 includes two keyways 23A, 23B, that run parallel and at right angles to each other, and extend longitudinally on its outer surface at the leading end of the circular tube 20. Face plate 12 includes a key 25 (best seen in FIG. 2 with the face plate 12 in its horizontal orientation) for keyways 23A, 23B and, in the figures, the device 10 is arranged such that the key 25 is slidably engaged in keyway 23A. The engagement between key 25 and the keyway 23A (or 23B in the vertical orientation depicted in FIG. 1D) prevents relative rotational movement between the circular tube 20 and the face plate 12 and ensures the correct deployment of the resiliently flexible member that is discussed in more detail hereunder. The length of the keyways 23A, 23B also predetermines the maximum distance that the circular tube 20 extends beyond the interior surface 16 and into the cavity 22.

Figure 1D:
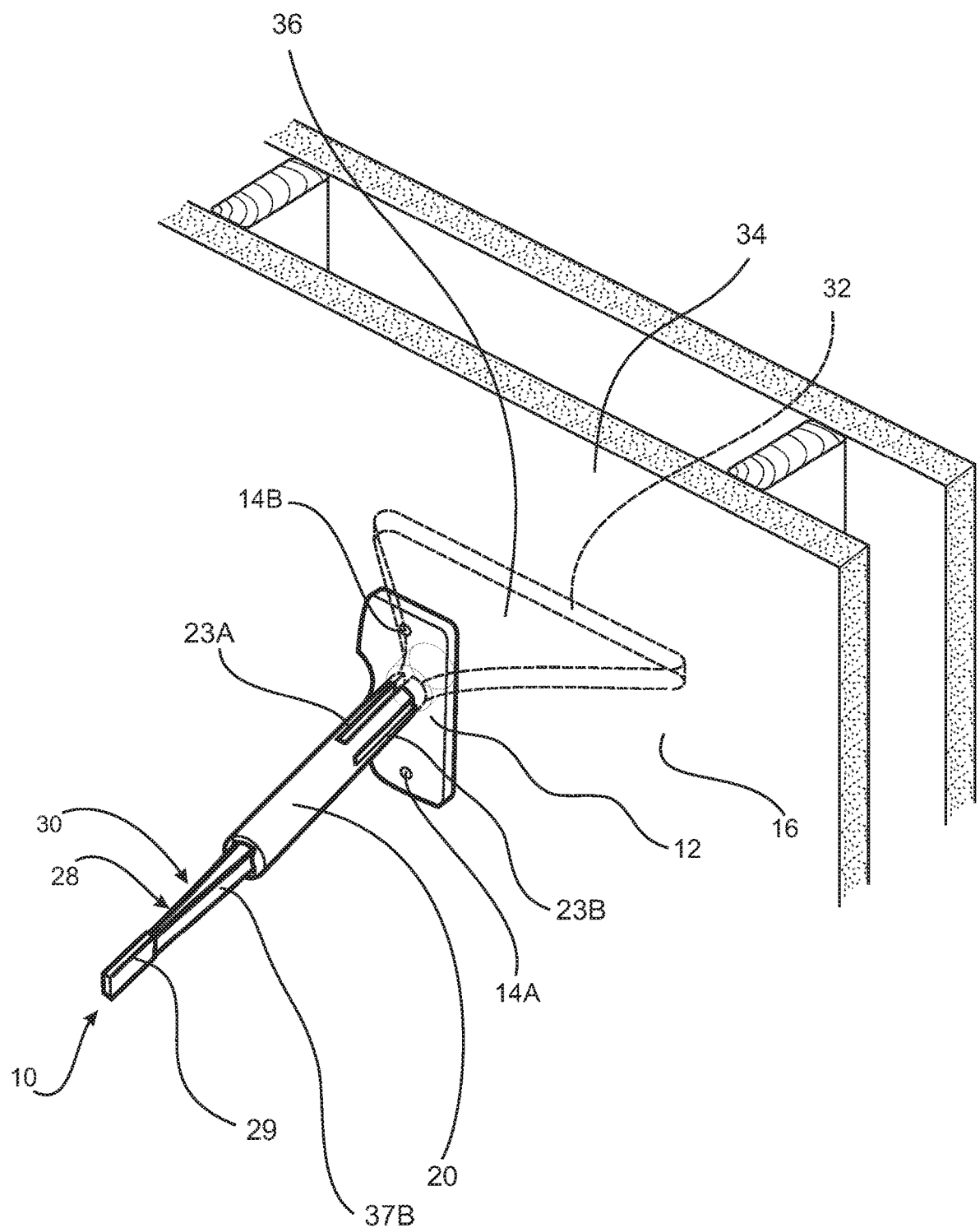
FIG. 1D is the same view as FIG. 1C but showing the device with the mounting member (face plate) vertically oriented.
Figure 2:
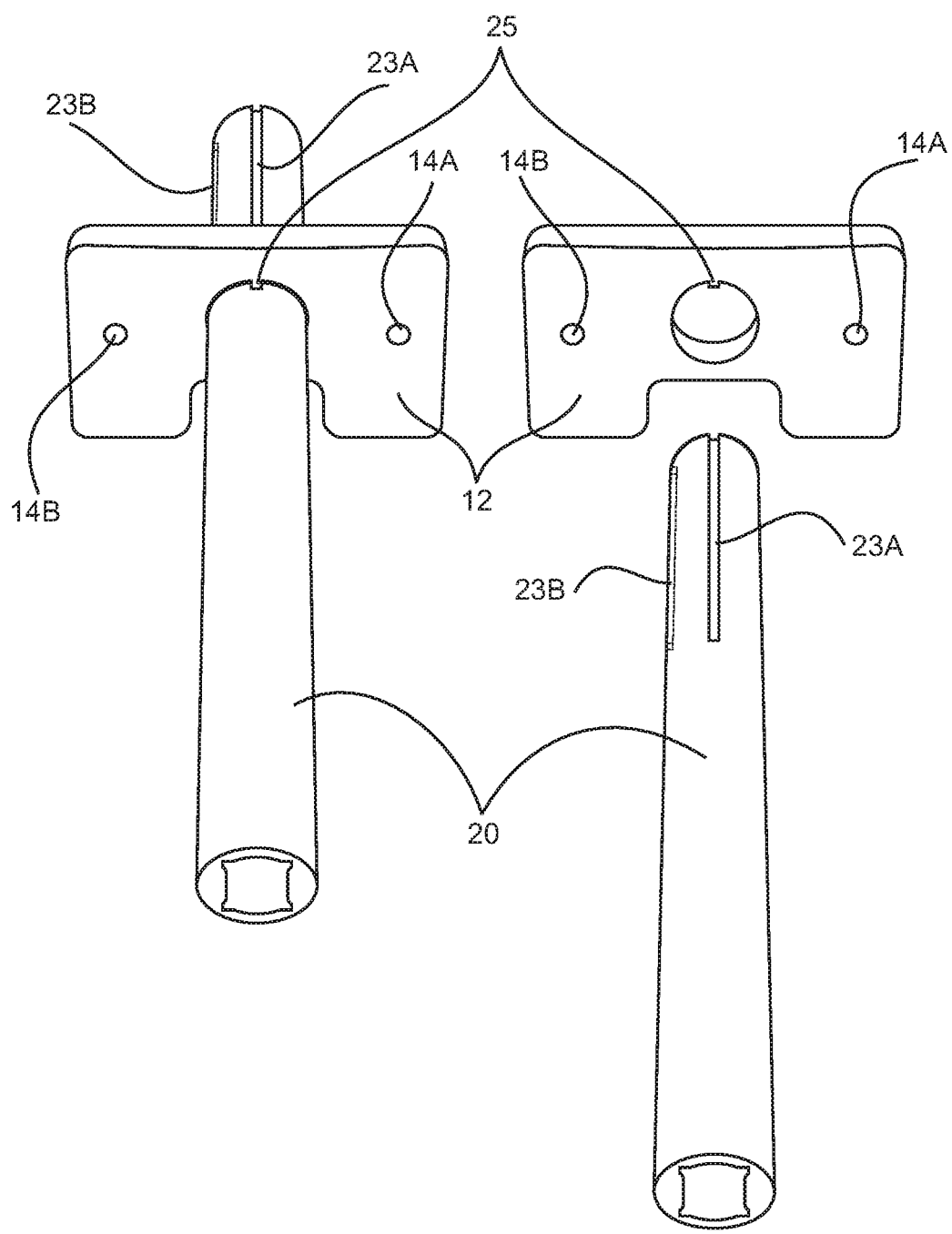
FIG. 2 is a perspective view of the device in FIG. 1A illustrating (i) the first conduit and the mounting means assembled and (ii) disassembled.

When the faceplate 12 is affixed to the interior surface 16 in a vertical orientation, and the circular tube 20 is slidably mounted thereto, key 25 engages in keyway 23B to prevent relative rotational movement between the circular tube 20 and the face plate 12 and ensure that the correct deployment of the resiliently flexible member. It is noted that the faceplate 12, in its vertical orientation (as depicted in FIG. 1D) may be more suited to other standard power point mounting points.

Figure 3:
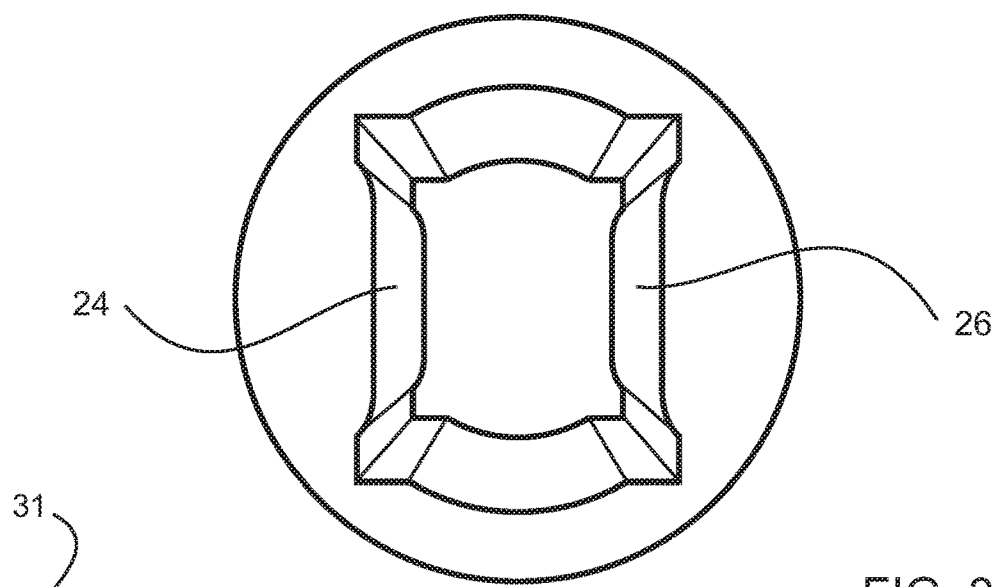
FIG. 3 is an end view (from the following end) of the circular tube depicted in FIGS. 1A and 1B showing the shaped surfaces.

The circular tube 20, includes first and second lateral guide members that each define respective first and second surfaces in the form of convex shapes surfaces 24, 26 that extend into and along the inside of the circular tube 20 (best seen in FIG. 3) and extend the entire length of the circular tube 20.

Figure 4:
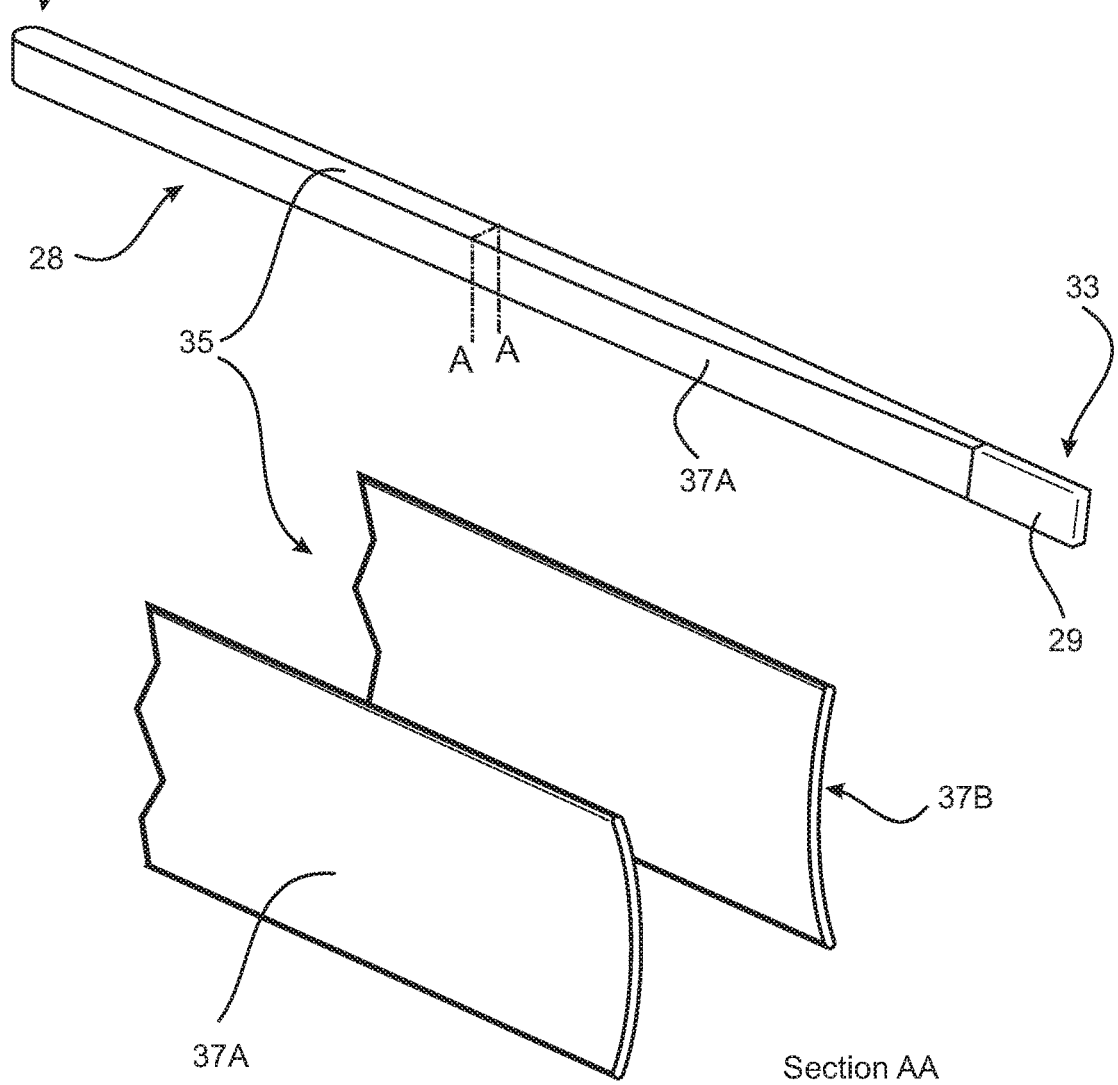
FIG. 4 is a perspective view of the resilient flexible member and a more detailed sectional view (A-A) of the shaped surfaces of the member.

The device 10 further comprises a resiliently flexible member in the form of a loop of spring steel 28, that can assume a narrow or strip-like configuration (best seen in FIG. 4) enabling it to pass through the circular tube 20 and define a leading end 31, a following end 33 and an interior space 35 (best seen in FIG. 4). The spring steel that forms the loop 28 has a concave profile (best seen in FIG. 4) and hence the loop 28 also defines concave surfaces 37A, 37B. Loop 28 also has a handle portion in the form of a cover 29 located at its following end.

In use, the loop of spring steel 28 can simultaneously define a stem portion 30 and a loop portion 32 formed in the cavity 22. In this regard, when the loop of spring steel 28 is threaded through the circular tube 20 it is slidingly retained and supported therein and guided by shaped surfaces 24, 26 in the circular tube 20 that co-operate with concave surfaces 37A, 37B defined by loop 28. The co-operation between the shaped surfaces 24, 26 and the concave surfaces 37A, 37B ensure the loop of spring steel 28 passes through the circular tube smoothly and remains in the correct orientation within the circular tube 20 so that when it enters the cavity 22 and impacts the wall 34 on the opposite side of the cavity 22 it deforms against wall 34 to form the loop portion 32 that in turn defines an area 36 of maximum size to capture a line passed into cavity 22.

Once the area 36 has been created, a line 78 can be passed into the cavity 22, usually from above, and through area 36. The loop of spring steel 28 is then withdrawn by a user to close around and pull the line 78 into and through the circular tube 20 until it reaches the second side of the cavity wall 18. It will be appreciated that the present invention allows for the retrieval of lines of any form such as electrical lines and or other cables for electronics or the like.

Figure 5:
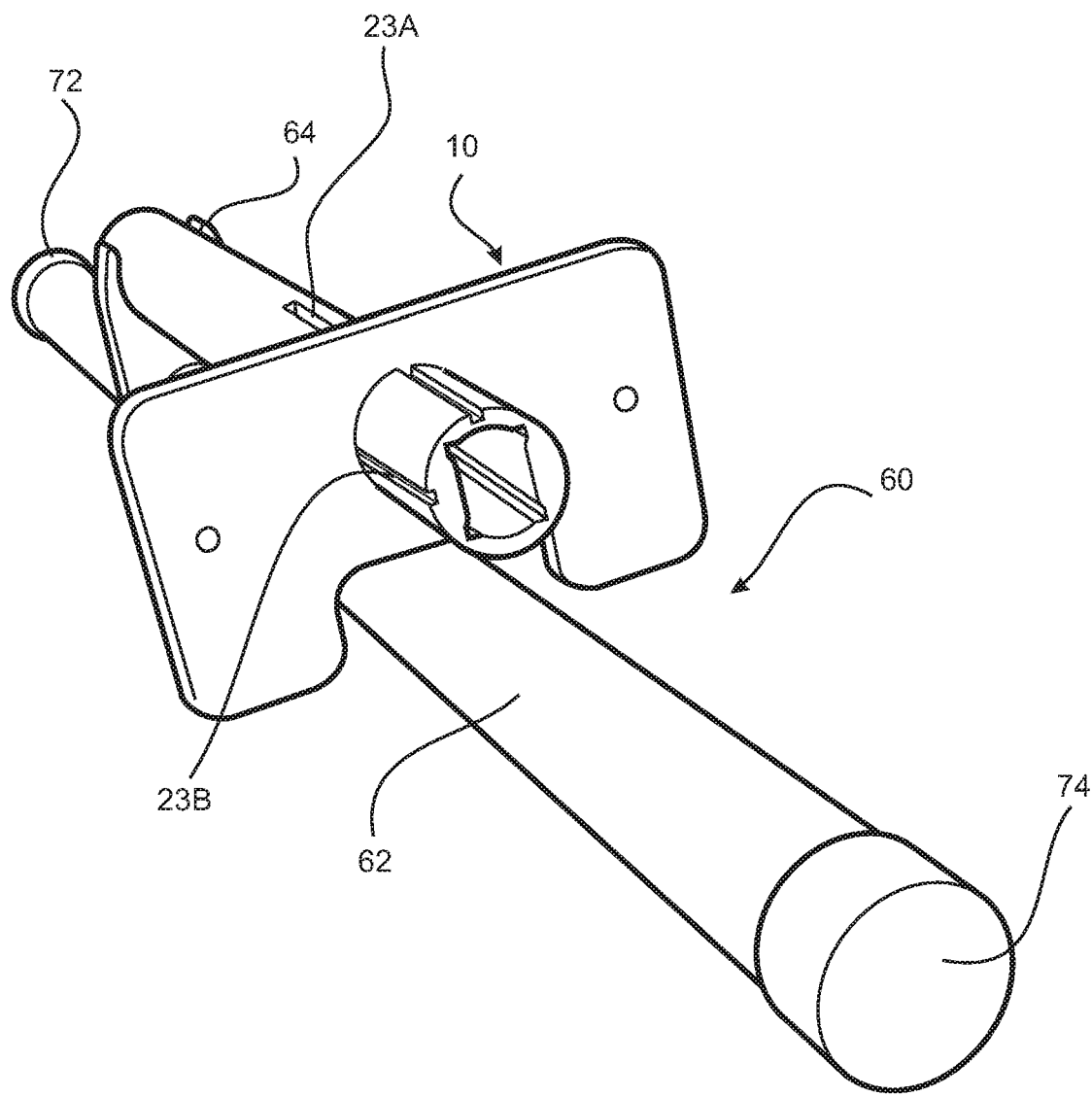
FIG. 5 is a perspective view of a kit according to one embodiment of a second aspect of the present invention, including the device in FIG. 1A.

FIG. 5 depicts a kit, generally indicated by the numeral 60, according to one embodiment of a second aspect of the present invention. The kit comprises the device 10 for capturing a line passed down a cavity depicted in FIGS. 1A-1C and 2 and a storage member for the flexible capturing loop member 28 and a plumb line 70 (best seen in FIG. 7), when not in use, in the form of a second tube member 62 (depicted separately in FIGS. 6A and 6B). The second tube member 62 and the device 10 are connected by a pair of clip members in the form of dual brackets 64, 66 that each define a part to friction fit the second tube member 62 and device 10. The brackets 64, 66 hold the second tube member 62 and the device 10 with sufficient force to releasably connect the components in a way that prevents inadvertent disconnection but allows disconnection by a user, as required. The second tube member is open at both ends but can be closed by end closures 72, 74.

FIG. 6B depicts the second tube member 62 revealing the flexible capturing loop member 28 and the plumb line 70 retained therein, at respective ends thereof.

Figure 7:
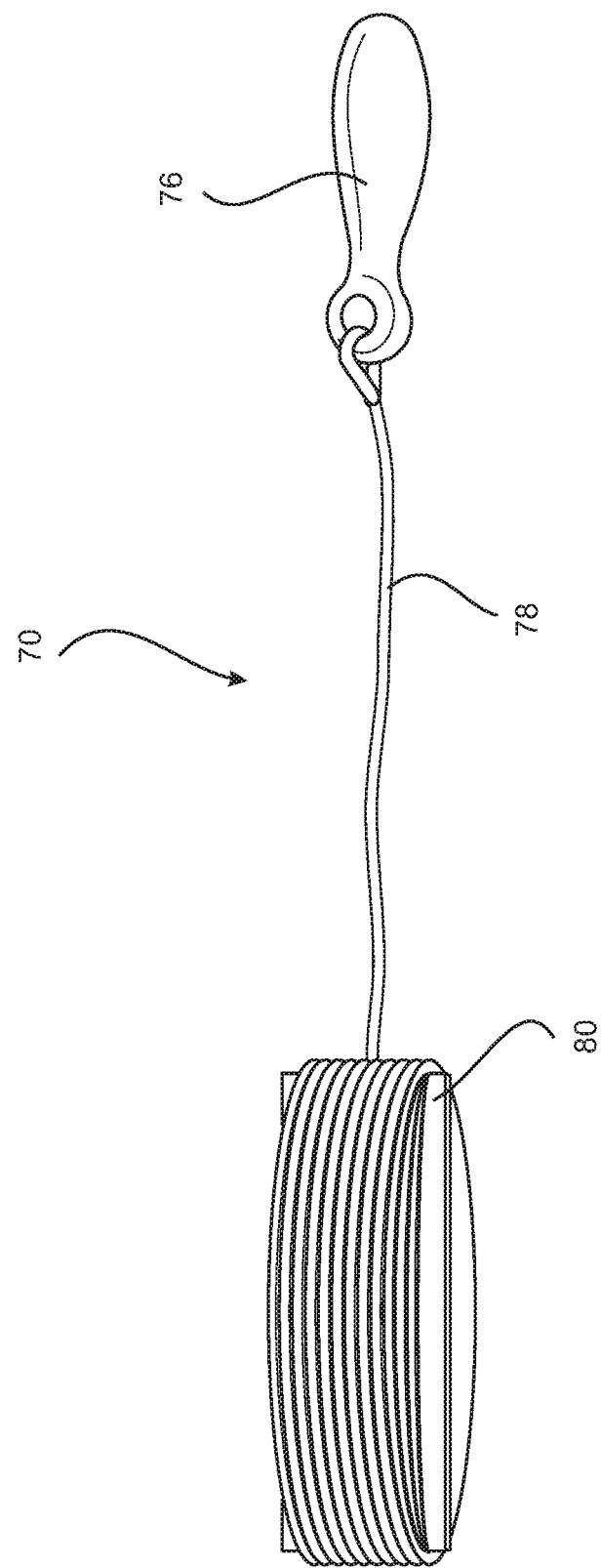
FIG. 7 is a perspective view of the plumb line depicted in FIG. 6B.

FIG. 7 depicts the plumb line 70 that comprises a weight element in the form of plumb 76 attached to a line in the form of string 78 wound around reel 80. In use, plumb 76, attached to the string 78 is dropped into the cavity 22 and through area 36 defined by the loop portion 32 of flexible capturing loop member 28 (see FIG. 1B). From this position, the string 78 can be retrieved and in turn any other line attached to said string can also be retrieved by a user.

The invention claimed is:

1. A device for capturing a line passed into a cavity on a first side of a structure and retrieving the line through to a second side of the structure via an opening therethrough, the device comprising:
   (a) a first conduit adapted to pass through the opening and define a pathway between the first and second sides of the structure, said first conduit being adapted to allow the line to be retrieved therethrough and including: a first lateral guide member that defines a first surface that is convex and extends into and along the inside of the first conduit; and a second lateral guide member, located opposite the first lateral guide member, that defines a second surface that is convex and extends into and along the inside of the first conduit;
   (b) a mounting member for the first conduit adapted to be releasably fixed to the second side of the structure adjacent to the opening; and
   (c) a resiliently flexible member, having a generally concave cross-section, capable of being passed through the first conduit and defining a stem portion, adapted to be guided by said first and second lateral guide members, and a loop portion in the cavity to capture said line.

2. The device according to claim 1, wherein the first conduit has a circular outer cross section.

3. The device according to claim 1, wherein the first conduit comprises at least one longitudinal groove, channel or keyway on an outer surface of the first conduit.

4. The device according to claim 1, wherein the first conduit comprises two longitudinal grooves, channels or keyways on an outer surface of the first conduit.

5. The device according to claim 3, wherein the groove, channel, or keyway co-operates with a compatible part of the mounting member to control the relative movement therebetween that (a) allows sliding movement, (b) limits or prevents relative rotational movement between the first conduit and the mounting member, or both (a) and (b).

6. The device according to claim 1, wherein the first and second lateral guide members define a track that guides the movement of the resiliently flexible member through the first conduit, wherein, when in use, the track is adapted to ensure that a main axis of the loop portion of the resiliently flexible member is oriented perpendicular, or near perpendicular to the first side of the structure.

7. The device according to claim 6, wherein the track allows for the resiliently flexible member to expand to a predetermined extent that ameliorates fatigue therein or undesirable deformation or weakening thereof.

8. The device according to claim 1, wherein the first and second surfaces of the first and second lateral guides are shaped to form a nested arrangement with the resiliently flexible member.

9. The device according to claim 1, wherein the mounting member is slidably fitted on the first conduit.

10. The device according to claim 1, wherein when fitted to the first conduit, the mounting member limits or prevent relative rotational movement between the mounting member and the first conduit.

11. The device according to claim 10, wherein the mounting member comprises a projection, tooth or key that is received in a compatible groove, channel or keyway located on the first conduit.

12. The device according to claim 1, wherein the mounting member includes an aperture for the first conduit.

13. The device according to claim 1, wherein the resiliently flexible member comprises a strip member that defines a leading end, a following end and an interior space and assumes a first configuration in which the strip member passes or slides through the first conduit and a second configuration in which the strip member defines the loop portion in the cavity to capture the line.

14. The device according to claim 13, wherein the strip member is adapted to assume the first and second configurations simultaneously.

15. The device according to claim 13, wherein the strip member comprises a generally "c" shaped cross-section.

16. The device according to claim 15, wherein the resiliently flexible member defines two outwardly facing concave surfaces.

17. The device according to claim 16, wherein when the resiliently flexible member is inserted in the first conduit, the two outwardly facing concave surfaces frictionally engage or are located immediately adjacent to the first and second surfaces of the first and second lateral guides.

18. The device according to claim 1, wherein the loop portion is deformable.

19. The device according to claim 4, wherein the two longitudinal grooves, channels or keyways on the outer surface of the first conduit are spaced at right angles to each other or otherwise apart by about 90°.

20. The device according to claim 4, wherein the groove, channel or keyway co-operates with a compatible part of the mounting member to control the relative movement therebetween that (a) allows sliding movement, (b) limits or prevents relative rotational movement between the first conduit and the mounting member, or both (a) and (b).

21. The device according to claim 19, wherein the groove, channel or keyway co-operates with a compatible part of the mounting member to control the relative movement therebetween that (a) allows sliding movement, (b) limits or prevents relative rotational movement between the first conduit and the mounting member, or both (a) and (b).

22. A kit comprising:
(a) the device according to claim 1; and
(b) a storage member for the resiliently flexible member.

* * * * *